Patented Mar. 6, 1951

2,544,391

UNITED STATES PATENT OFFICE 2,544,391

COATING COMPOSITION

Paul E. Marling, Dayton, Ohio, assignor to Monsanto Chemical Company, St. Louis, Mo., a corporation of Delaware No Drawing. Application December 30, 1948, Serial No. 68,413

5 Claims. (Cl. 106—14)

This invention relates to coating compositions for surface protection, and particularly the prevention of metal corrosion. More specifically, the invention relates to a new paint pigment having unusual properties as are set forth hereunder.

Iron oxides have long been used as pigments in the preparation of coating compositions for protecting metallic and other surfaces due to their ready availability and desirable properties of the films so produced. The primary purpose of this invention is to provide an improved coating composition which is particularly useful for protecting wood and metal surfaces. A further purpose of this invention is to provide a pigment which is unusually adapted to compounding operations.

It has been found that solid iron carbonyls, which are made by the reaction of carbon monoxide on metallic iron, are unusually adapted to use as pigments for coating compositions. These compounds are crystalline solids which are readily reduced to a fine state of subdivision and do not require the grinding operations which are necessary for the preparation of iron oxide pigments. There are two chemical forms of iron carbonyl, either of which is useful in the practice of this invention, $Fe(CO)_5$ and $Fe_2(CO)_9$. Either of these or a mixture of the two may be used for the preparation of the new coating compositions.

The use of iron carbonyl as a pigment shows improvement over the use of iron oxide, and the improvement over the use of iron powder, which is similarly capable of oxidation, is unusually convincing. Further advantages derived from the use of iron carbonyl as a pigment result from the ease of compounding coating compositions therefrom. Besides the ease of reduction to a desired state of subdivision, the iron carbonyl does not form aggregates, which are encountered in iron oxide paint compounding, and also does not settle out during storage and use.

The iron carbonyl may be used as a pigment with any of the conventional paint compositions. For example, it is useful in drying oil paints, in alkyd resin type paints, in lacquers and, in general in any resin forming liquid coating composition.

Suitable "resin forming compositions" for use in the practice of this invention are the drying oils and semi-drying oils, such as linseed oil, tung oil, dehydrated castor oil, soy bean oil, poppy oil, oiticica oil, and other glycerides of oleic, linoleic, linolenic, eleostearic, geranic, sorbic, palmitolic and humeroceric acids. Generally any liquid composition which absorbs oxygen and hardens in air, or under the influence of increased temperatures, is useful in the practice of this invention and in the preparation of hard surface coatings.

The unsaturated alkyd resins may also be used as the resin forming component of the new surface coating compositions. For example, a drying oil may be heated with glycerine or other polyhydroxy alcohol, such as ethylene glycol, diethylene glycol, erythritol, or pentaerythritol, and the resulting partial ester of the polyhydroxy compound and the drying oil acids is then reacted with a polybasic acid, such as phthalic acid, maleic acid, succinic acid or adipic acid, to form a soft solid or viscous liquid compounds which are readily polymerizable to form a hard surface coating resin. The same alkyd resins may be prepared by interreaction of the polyhydroxy alcohol and the unsaturated acid in suitable proportions, and then converted to the unsaturated alkyd by reaction with the dibasic acid.

Other useful resin forming compositions are the modified drying oils and unsaturated alkyd resins, in which the oil or alkyd is copolymerized with one or more olefinic compounds, such as styrene, vinyl biphenyl, α-methyl styrene and isopropenyl biphenyl. These compositions are prepared by copolymerizing the oil or alkyd and the olefinic compound by means of a peroxy catalyst, either by mass polymerization, or in solution in a suitable solvent. The polymerization is conducted until a soft soluble solid or viscous liquid is formed. These compositions are known to the art as "styrenated alkyd resins" or "styrenated oils" and have the property of drying in air, with or without the influence of heat. These copolymers, if liquid, may be used as the resin forming component, solutions of the solid copolymers in common solvents, such as turpentine, xylene, mineral spirits, toluene, and benzene, may be similarly used.

Other substances which undergo drying or polymerization phenomenon when heated or upon standing at room temperatures may also be used as the "resin forming composition," for example natural rubber latex, vinyl esters of tall oil, and other olefinic compounds usually containing suitable peroxy catalysts.

Other "resin forming compositions" are the solutions, or dispersions of solid film forming substances in liquid medium, capable of forming continuous films by evaporation of the solvent, or other medium. This type of coating composition includes the lacquers, such as solutions of alkyds, phenolic resins, cellulose esters, cellulose ethers, shellac, natural rubber, synthetic rubber, chlorinated rubber, coumarin indene resins, melamine resins, other natural or synthetic resins of non-drying nature, in solvent media, such as ethyl acetate, butyl acetate, methyl ethyl ketone, acetone, petroleum ether, dioxane, xylene, benzene, nitropropane, toluene and other volatile liquid organic compounds. Other "resin forming compositions" are the emulsions which form films by the evaporation of the disperse medium, such as the synthetic rubber latices, the emulsion polymers of styrene, acrylic esters, acrylonitrile, vinyl chloride and vinyl acetate.

The quantity of iron carbonyl pigment in the coating compositions will depend to some extent upon the particular "resin forming composition" and whether other pigments are present. The total pigment in a preferred drying oil coating composition will be 50 to 80 percent by weight. In alkyd paints and lacquers from 25 to 50 percent will usually be used. Frequently it is desirable to use other pigmenting compounds, particularly those imparting a desired color or for unusual opacity. Thus, lead chromate, lithopone, titanium dioxide, zinc oxide and white lead may be used in addition to the iron carbonyl. As little as five percent by weight of iron carbonyl, often with other pigment, will produce a useful coating composition. The iron carbonyl may be present to the extent of 80 percent.

Other conventional film forming components may be added to the new coating compositions, for example metallic salt driers, such as the organic acid salts of metals, such as cobalt, manganese and lead, particularly the naphthenic acid salts.

Further details of the preparation and use of the new coating compositions are set forth with respect to the following specific examples.

Example 1

Surface coating compositions were prepared with each of the pigments: iron carbonyl, iron powder, and Spanish iron oxide, using the formulation:

| | Parts by weight |
|---|---|
| Pigment | 15 |
| Linseed oil | 6 |

Drier as percent metal based on the oil

| | Percent |
|---|---|
| Lead naphthenate | 1.0 |
| Cobalt naphthenate | 0.05 |
| Manganese naphthenate | 0.01 |

The three surface coating compositions were applied to steel panels and subjected to a corrosive atmosphere. The iron powder pigmented composition showed slight rusting at the end of forty days, whereas the Spanish iron oxide composition showed slight rusting after one hundred days. The coating composition containing the iron carbonyl was in perfect condition at the end of one hundred days.

Example 2

Surface coating experiments were made using an unsaturated alkyd resin varnish made by heating a mixture of 80 parts by weight of linseed oil fatty acids, 4 parts of pentaerythritol, 48 parts of glycerine and 88 parts of phthalic anhydride, for one hour and fifty minutes at 450–460° F. with agitation, in an inert atmosphere. The alkyd so produced had an acid number of 20.8. A solution of 153 parts by weight of this alkyd in 153 parts of mineral spirits and 120 parts of xylene was prepared. Coating compositions were made from each of the pigments: iron carbonyl, Spanish iron oxide, and iron powder using the formulation:

| | Parts by weight |
|---|---|
| Pigment | 7.5 |
| Alkyd solution | 17.5 |
| Xylene | 5.0 |

Each composition contained 0.02% cobalt based on the alkyd solids in the form of cobalt naphthenate.

Steel panels were coated with the three surface coatings and were subjected to a corrosive atmosphere for one hundred days. The sample containing iron powder pigment showed bad rusting, whereas the Spanish iron oxide pigmented sample was only slightly rusted. On the other hand the paint including the iron carbonyl provided a perfect protection for the steel panel and no sign of rust was observed.

Example 3

Steel panels having one coat of the oil paint described in Example 1, were tested under outdoor conditions in Southwestern Ohio. After one year the powdered metal showed severe rusting. After four years the panels utilizing the Spanish iron oxide showed slight rusting, whereas the powdered iron coating composition had failed completely. On the other hand the iron carbonyl paint was in good condition after four years.

Example 4

Weathering tests in Southwestern Ohio were conducted using wood panels with each of the paint compositions described in Example 2. After four years the panels coated with the iron carbonyl paint were sound and the surface was in fair condition. The panels coated with paints incorporating Spanish iron oxide and powdered metal were in very poor condition; the panels were checked and split by the weathering.

The invention is defined by the following claims.

1. A coating film comprising a solid resinous composition containing intimately dispersed therein from 5 to 80 percent, based on the solid resinous composition, of iron carbonyl.

2. A liquid coating composition comprising a composition capable of producing a resinous film on drying containing intimately dispersed therein from 5 to 80 percent, based on the resin, of iron carbonyl.

3. A liquid coating composition, comprising a drying oil and from 50 to 80 percent, based on the drying oil, of iron carbonyl.

4. A liquid coating composition comprising an unsaturated alkyd resin and from 25 to 50 percent, based on the unsaturated alkyd, of iron carbonyl.

5. A liquid coating composition comprising a solid resinous material, solvent for said solid resinous material, and from 25 to 50 percent, based on the solid resinous material, of iron carbonyl.

PAUL E. MARLING.

No references cited.